(12) United States Patent
Horner et al.

(10) Patent No.: US 6,305,128 B1
(45) Date of Patent: Oct. 23, 2001

(54) INSULATED BULKHEAD

(75) Inventors: John F. Horner, Jupiter; Richard J. Coughtry, Stuart, both of FL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/643,556

(22) Filed: Aug. 23, 2000

(51) Int. Cl.[7] .................................................. E05C 21/02
(52) U.S. Cl. ............................ 49/465; 160/40; 160/351
(58) Field of Search .............................. 49/463, 464, 465, 49/304, 307, 310; 160/215, 216, 217, 40, 351, 405; 296/24.1; 410/127, 128, 129

(56) References Cited

U.S. PATENT DOCUMENTS

| | | |
|---|---|---|
| 1,810,780 | 6/1931 | Moore . |
| 1,896,198 | 2/1933 | MacMillan . |
| 3,126,050 * | 3/1964 | Lapof ...................................... 160/40 |
| 3,280,526 * | 10/1966 | Pepitone ............................ 160/40 X |
| 4,049,311 * | 9/1977 | Dietrich et al. ...................... 296/24.1 |
| 4,222,696 * | 9/1980 | Guins .................................... 410/128 |
| 4,880,342 | 11/1989 | Pradovic .............................. 410/121 |
| 5,010,943 * | 4/1991 | Boyer .................................... 160/351 |
| 5,054,295 | 10/1991 | Goulooze ................................ 62/239 |
| 5,807,046 | 9/1998 | Onken .................................. 410/129 |
| 5,833,413 | 11/1998 | Cornelius .............................. 410/119 |

FOREIGN PATENT DOCUMENTS 2 226 993 A   7/1990   (GB) .

OTHER PUBLICATIONS

"Center Partition—Multi-Temperature Refrigeration Systems," product information, F/G Products, Inc., Rice Lake, WN, 9 pages.

"Flex-Lite—Insulated Bulkhead with Armorlite™, "product information, F/G Products, Inc., Rice Lake, WN, 4 pages.

"Center Divider Systems from Randall," product information, Randall Manufacturing, Elmhurst, IL, 4 pages.

"'The Tough One'—Temperature Control Bulkheads," product information, Randall Industries, Inc., Bensenville, IL, 8 pages.

"For Superior Performance and Savings, Make it a Loadmaker Bulkhead," product information, R•O•M Corporation, Kansas City, MO, 11 pages.

"* Temparitions—Insulated Bulkhead Lines, " product information, Tempar Inc., Kent, WA, 8 pages.

"Show Your Customers You Really Care!" (Tempar's Temparitioning Longitudinal Compartments), product information, Tempar Inc., Kent WA, 2 pages.

* cited by examiner

*Primary Examiner*—David M. Purol
(74) *Attorney, Agent, or Firm*—Banner & Witcoff, Ltd.

(57) ABSTRACT

A bulkhead includes an upper member and a lower member which are vertically adjustable to vary the height of the bulkhead. The bulkhead has a reduced thickness portion along at least one vertical edge. The reduced thickness portion is configured to overlap with a reduced thickness portion of another bulkhead in order to vary the width of the partition.

31 Claims, 6 Drawing Sheets

INSULATED BULKHEAD

FIELD OF THE INVENTION

The present invention is directed to a bulkhead for partitioning a container into separate compartments, and, more particularly, to an insulated bulkhead that can easily be adjusted to partition refrigerated trailers of various heights and widths.

BACKGROUND OF THE INVENTION

Portable insulated partitions, commonly referred to as bulkheads, are used in the food distribution industry to compartmentalize refrigerated containers and bodies, such as trailers. The bulkheads allow for multiple temperature zones within a trailer. The bulkheads are typically used to divide a trailer transversely, but could also be used longitudinally.

A typical insulated bulkhead is formed as a panel having a certain height and width, and provided with a compressible gasket around its periphery to achieve a tight seal within the trailer. However, there are no standards in the trucking industry to dictate the inside width and height dimensions of the trailers. Therefore, such bulkheads must be manufactured to a specific trailer dimension to ensure a tight fit with the trailer walls, floor and ceiling. This lack of uniformity limits the use of each bulkhead and requires many sizes to be made and kept in inventory in order to meet custom fit specifications. Producing custom fit bulkheads results not only in cost disadvantages, but can also cause lead time problems when trying to obtain a panel of the appropriate size.

SUMMARY OF THE INVENTION

The present invention pertains to a unique insulated bulkhead having a universal application in subdividing refrigerated containers, such as refrigerated truck trailers, in an easy and effective manner irrespective of dimensional variations in the height and width of the containers.

In accordance with a first aspect of the invention, a bulkhead for a refrigerated container includes upper and lower members which are vertically adjustable to vary its height to fit equally well in a wide variety of truck trailers.

In a second aspect, the bulkhead has a reduced thickness portion along at least one vertical edge so as to overlap with another of the inventive bulkheads. The overlap between the adjacent bulkheads is adjustable such that the bulkheads can sealingly engage the opposite walls of trailers having differing widths, or engage adjacent panels in the case where more than two panels are used to subdivide a container. Moreover, in the preferred embodiment, the bulkheads are aligned in a plane to consume minimal space within the trailer.

In a third aspect, the bulkhead includes side seals which form a substantially continuous seal despite the making of height adjustments which may be needed to fit a particular trailer.

The present invention provides a significant advance over the conventional bulkheads. Preferred embodiments of the bulkhead of the present invention provide an apparatus that is easily adjustable to effectively partition refrigerated containers of various heights and widths. These and additional features and advantages of the invention will be further understood from the following detailed disclosure of preferred embodiments.

Figure 1:
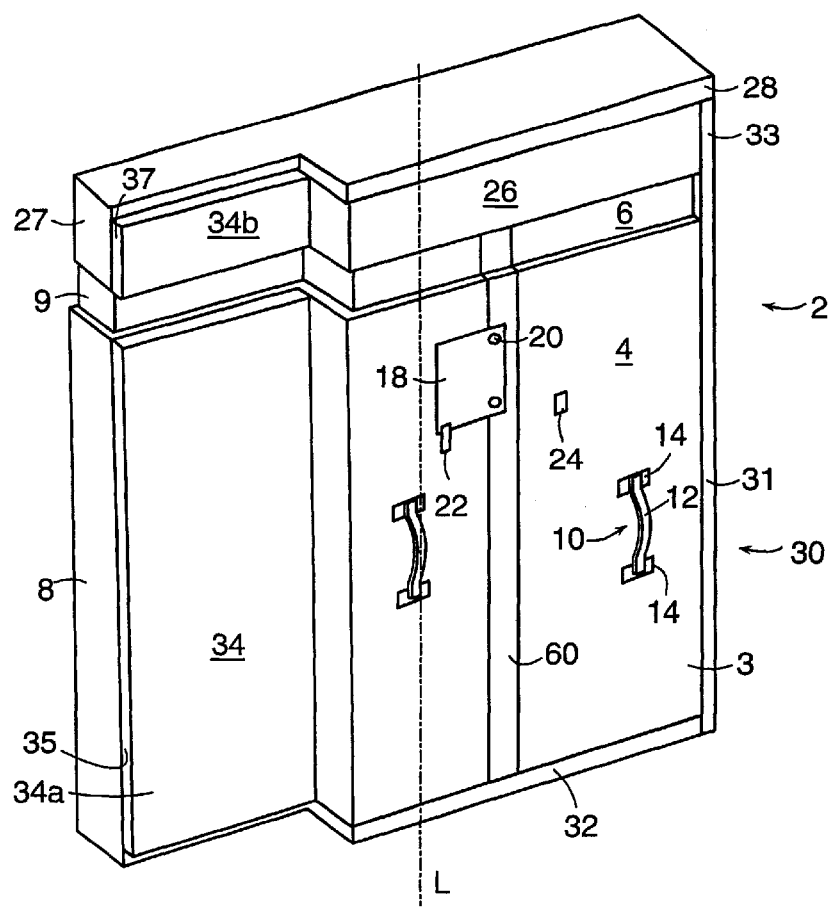
FIG. 1 is a perspective view of an insulated bulkhead in accordance with the present invention.

The figures referred to above are not drawn necessarily to scale and should be understood to present a representation of the invention, illustrative of the principles involved. Some features of the bulkhead depicted in the drawings have been enlarged or distorted relative to others to facilitate explanation and understanding. The same reference numbers are used in the drawings for similar or identical components and features shown in various alternative embodiments. Bulkheads as disclosed herein, will have configurations and components determined, in part, by the intended application and environment in which they are used.

DETAILED DESCRIPTION OF THE PREFERRED EMBODIMENTS

An insulated bulkhead of the present invention can be used to compartmentalize containers, and is particularly suited for use in refrigerated trailers. The bulkhead includes an upper member and a lower member which are vertically adjustable relative to each other to permit a secure placement of the bulkhead at any desired position in the trailer and to fit within trailers of different heights. Further, two or more bulkheads can be positioned in overlapping fashion within a trailer to compartmentalize the trailer and provide multiple temperature zones within the trailer. The trailer can be divided either transversely or longitudinally. It is to be appreciated that multiple pairs of the bulkheads could be provided to form additional compartments within the trailer. Other suitable uses for the bulkheads of the present invention are anticipated, and will be readily apparent to those skilled in the art, given the benefit of this disclosure.

As shown in FIG. 1, a bulkhead 2 in accordance with the invention comprises a panel member 3 having a base or first portion 4 and an upstanding stem or second portion 6. The stem 6 has a reduced depth or thickness as compared to base 4 in order to slidably receive a cap 26. The cap preferably has the same thickness as panel member 3 and includes a socket for matingly receiving stem 6. The cap is movable along the stem to provide vertical adjustment of the bulkhead. In the illustrated embodiment, stem 6 is positioned above base 4; however, it is to be appreciated that the first and second portions 4, 6 may be oriented differently with respect to one another, e.g., first portion 4 may be positioned above second portion 6. Alternatively, the stem 6 could also be provided on the cap for slidable receipt in and out of the panel member 3.

Figure 10:
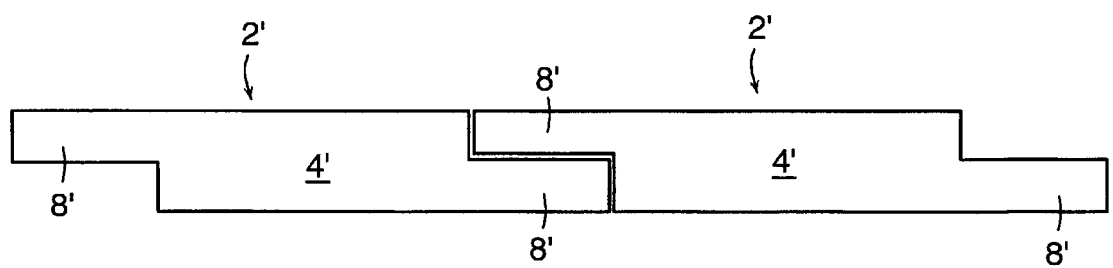
FIG. 10 is a top plan view of a second alternative embodiment of the bulkhead of FIG. 1, shown in overlapped manner with another such bulkhead.

The base and stem 4, 6 each have a reduced thickness portion 8, 9 aligned along one vertical edge of the bulkhead, seen as the left edge in FIG. 1. Likewise, cap 26 has a corresponding reduced thickness portion 27. As discussed more fully below, the reduced thickness portions along the side edges enable complementary bulkheads to overlap each other in a line without taking up any unnecessary trailer space. As an alternative, reduced thickness portions can be provided along both vertical side edges of the bulkheads 2' (FIG. 10) to permit the aligning of more than two bulkheads when spanning a distance greater than the width of two bulkheads, and to enable the use of the bulkheads in either a left or right position without the need to rotate the bulkhead in the trailer. Although rotation may still be needed, the two opposite reduced thickness portions could both be along the same face of the bulkhead (not shown) as opposed to opposite faces as shown in FIG. 10.

A pair of handles 10 are provided on each side of bulkhead 2 to facilitate handling and manual moving of the bulkhead within the trailer (FIG. 1). In the illustrated embodiment, handles 10 are formed of a strap 12, each end of strap 12 being secured to a plate 14, with plates 14 in turn being secured to bulkhead 2. Of course, many types of hand grips could be used, such as recesses 10' seen in FIG. 5.

Seal members are preferably provided around substantially the entire peripheral edge of bulkhead 2 so as to include a top seal 28 along the top of cap 26, side seal 30 provided along the side edge of bulkhead 2 opposite the reduced thickness portions 8, 9, 27 (seen as the right vertical edge of the bulkhead in FIG. 1), a bottom seal 32 along the bottom of panel member 3, and a front seal along the reduced thickness portions 8, 27. The seals can have any conventional configuration to form a seal with the trailer floor, ceiling, wall, or adjacent panel. In an embodiment with two reduced thickness portions, such as shown in FIG. 10, each side of the bulkhead would include a side seal and a front seal.

Figure 5:
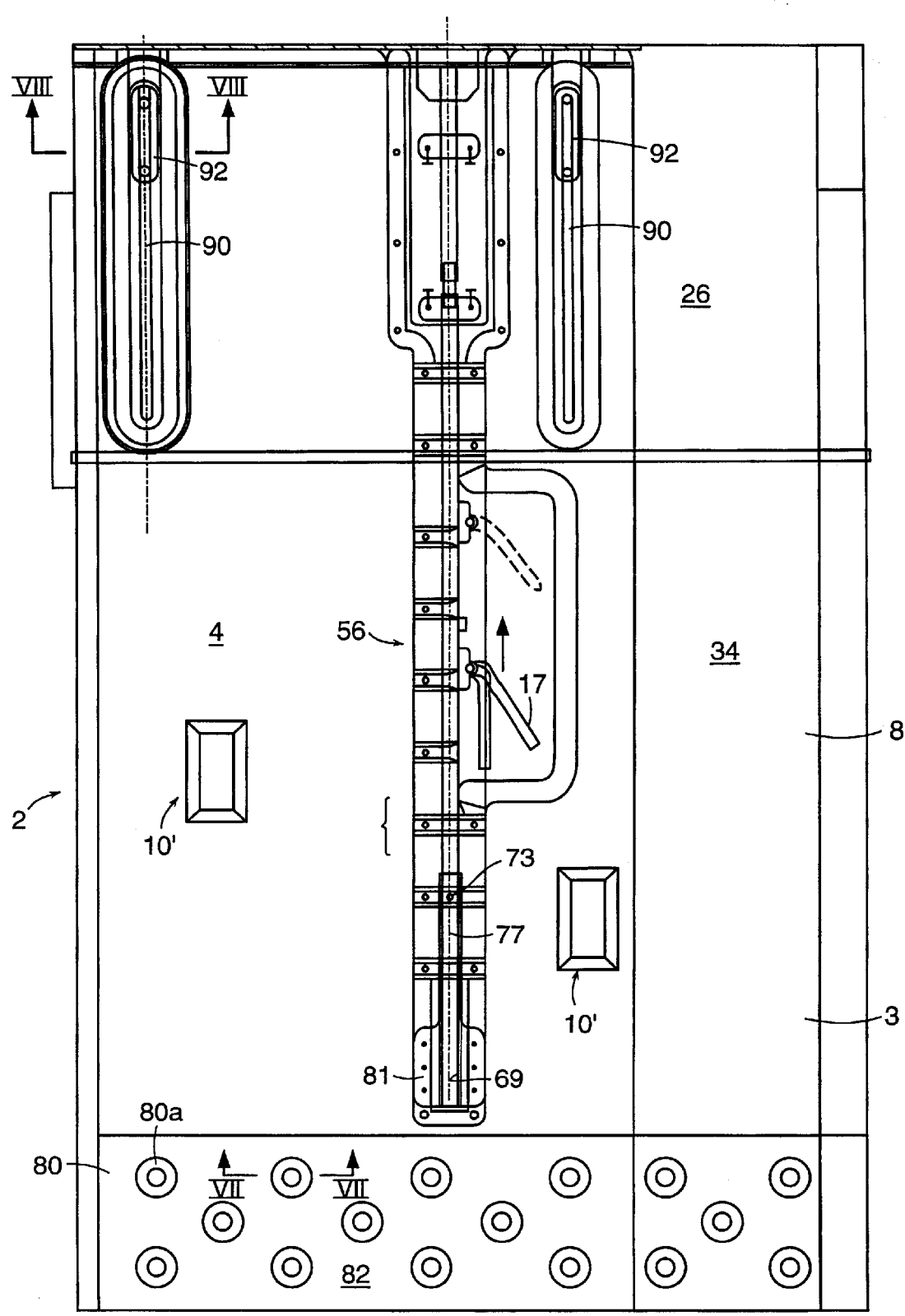
FIG. 5 is a partial top plan view of the bulkhead of FIG. 1, showing a side seal construction.
Figure 6:
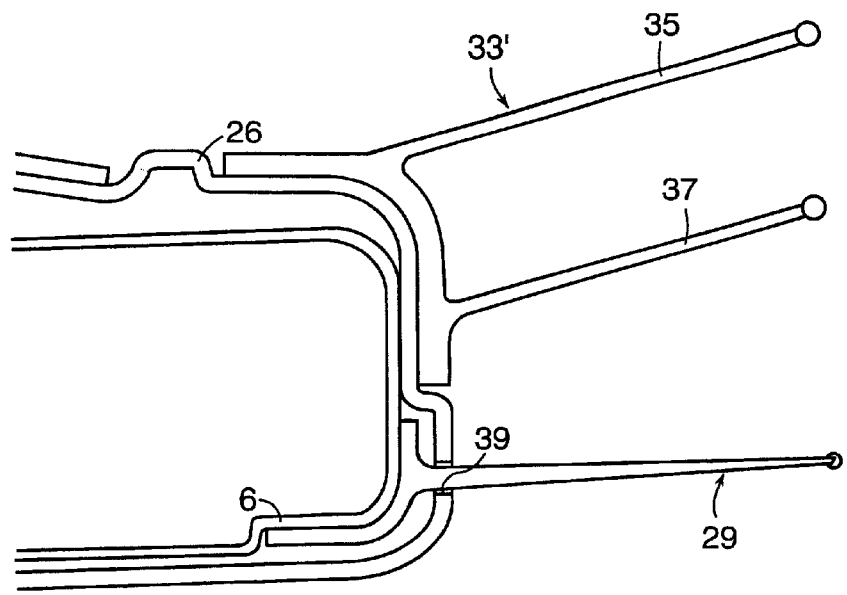
FIG. 6 is an elevational view of an alternative embodiment of the bulkhead of FIG. 1.

In the FIG. 1 embodiment, the side seal 30 is formed of a lower seal 31 along the side edge of base 4, and a cap seal 33 along the side edge of the cap. The cap seal 33 extends downward over stem 6 and overlaps lower seal 31. However, the side seal 30 is preferably formed of a lower seal 31' extending along the side edge of base 4, an upper seal 29 extending along stem 6, and a cap seal 33' extending along cap 26 (FIGS. 5 and 6). Cap seal 33' includes a first member 35 and a second member 37, and moves up and down with cap 26. Upper seal 29 is offset from cap seal 33' and extends through a slot 39 formed in the side of cap 26. Thus, as cap 26 moves along stem 6, cap seal 33' and upper seal 29 both remain engaged with the wall of the trailer, providing a more complete seal along the vertical edge of bulkhead 2. Lower seal 31' preferably has a similar construction to that of cap seal 33', and is in general alignment with cap seal 33' and offset from upper seal 29.

The top seal 28 can be formed as a single piece with cap seal 33 or as a separate member attached to the cap to form a continuous or substantially continuous seal. Similarly, the side seal 30 may be formed as one piece with bottom seal 32 or as separate members.

Front seal 34 is provided along the front surface of reduced thickness portions 8, 27. The front seal is generally formed of two parts with one part 34a attached to the front surface 35 of the reduced thickness portion 8 of base 4, and another part 34b attached to the front surface 37 of the reduced thickness portion 27 of cap 26. The seals preferably cover the entire front surfaces 35, 37 to which they are attached, but could have a reduced width. If the front seal 34 is given a reduced width it would preferably be positioned along the outer edge of the bulkhead to provide maximum adjustability. In a preferred embodiment, seals 28, 30, 32, and 34 are formed of rubber or a compressible foam, e.g., neoprene, urethane, or EPDM.

In bulkheads having a pair of reduced thickness portions, such as in FIG. 10, each side of the bulkhead includes a side seal 30 and a front seal 34.

Panel members 3 and caps 26 are insulated to provide thermal isolation between a first compartment 38 and a second compartment 40. Panel members 3 may be formed of a shell 42 and a layer of insulating filler material 44. The shell 42 may be a plastic, such as ABS, HDPE, polycarbonate, a reinforced composite, or other suitable material providing rigidity and strength for the bulkhead 2. In certain preferred embodiments, a less rigid material such as soft vinyl or foam could be used. The layer of filler material 44 may be rigid urethane foam, soft foam, trapped air, or other suitable insulating material. The cap is preferably made having the same general construction and materials as the panel.

Figure 4:
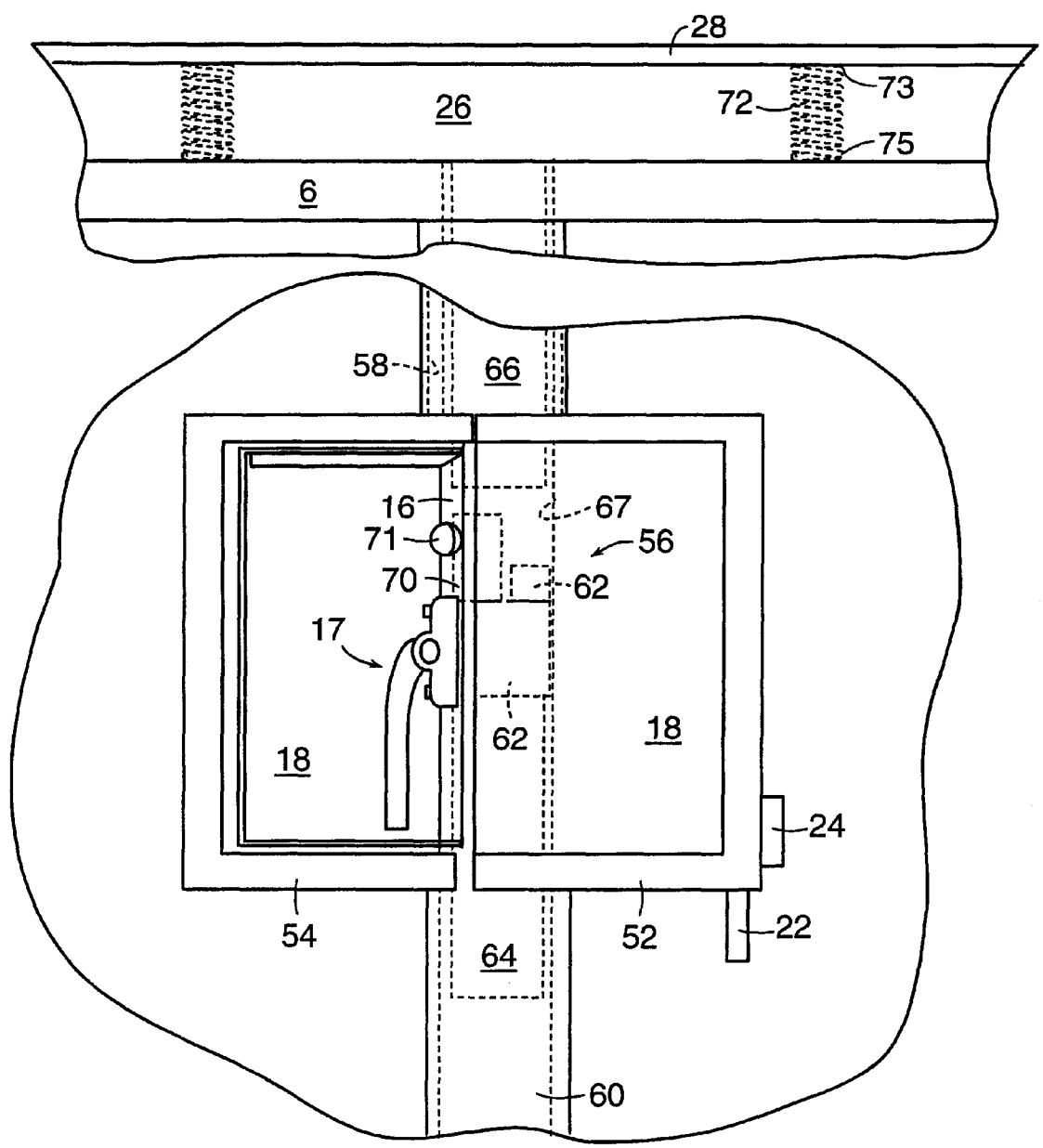
FIG. 4 is a partial elevational view of the bulkhead of FIG. 1 showing a hydraulic apparatus for adjusting the height of the bulkhead.

An aperture 16, seen in FIG. 4, is provided in bulkhead 2 to provide operational access to an actuator, such as a hydraulic actuator or jacking bar 17, for vertically adjusting the height of the bulkhead as described in greater detail below. Aperture 16 can also provide venting as necessary between the compartments formed in a container by a mating pair of bulkheads 2. A cover 18 is provided on each side of the bulkhead to open or close the aperture as desired.

In a preferred embodiment, cover 18 is formed of a flexible material, such as coated vinyl fabric or plastic, secured along one edge thereof to bulkhead 2 by fasteners 20, such as rivets, screws, bolts, etc. The cover may also be secured to the panel via hinge members (not shown). The cover may further have insulation (e.g., open or closed cell foam) attached to its inner surface. A latch member 22 is secured to an opposing edge of cover 18. Latch member 22 can be secured to mating latch member 24 provided on bulkhead 2 to retain cover 18 in an open position, as seen in FIG. 4. Mating latching members 52 and 54 are further provided on cover 18 and bulkhead 2, respectively, to allow cover 18 to be securely fastened to bulkhead 2 in its closed position. In a preferred embodiment, latching members 22, 24 and 52, 54 are mating hook and loop fasteners, however, other suitable fasteners are considered within the scope of the invention.

As noted above, cap 26 can be adjusted in a vertical direction along stem 6. Vertical adjustment of cap 26 allows the height of bulkhead 2 to be infinitely adjustable within a given range, to tightly compress the top seal 28 against ceiling 46 and bottom seal 32 against floor 48 (FIG. 3), and to hold the bulkhead in a fixed position within the trailer. Cap 26 preferably provides an adjustment range of at least approximately 6"–8", and possibly up to 16" or more, in height for bulkhead 2 to accommodate the height variations in different trailers.

In a preferred embodiment, seen in FIG. 4, the movement of the cap 26 is controlled via a hydraulic assembly 56 having an actuator, such as a jacking bar 17, located within aperture 16. Covers 18 can be opened to access jacking bar 17 from either side of the bulkhead 2. As shown in FIG. 4, the rear cover 18 is shown in its open position. Cap 26 moves upwardly as jacking bar 17 is pumped up and down to thereby provide a controlled adjustment of the height of bulkhead 2. Hydraulic assembly 56 has a piston and cylinder construction which extends vertically along bulkhead 2 within channel 58. The channel 58 is preferably covered by plate 60. The hydraulic assembly preferably extends from top to bottom in the bulkhead, but could be shorter and secured to frameworks within the panel and cap.

Hydraulic assembly 56 comprises a pump 62, which is actuated by jacking bar 17 to pump oil or the like from a reservoir 64. A drive member such as cylinder 66 is contained and moves vertically along a mounting bar 67, and is connected at its upper end to cap 26. The oil pumped from reservoir 64 drives cylinder 66 and cap 26 upwardly along mounting bar 67 in a known manner. As cap 26 moves upwardly, springs 72, secured at a first end 73 to panel member 3 and at a second end 75 to cap 26, are stretched. A pressure relief valve 68 is provided on hydraulic assembly 56 in order to prevent excessive pressure from building up, to thereby reduce the possibility of damaging the ceiling and/or floor of the container or the bulkhead. In a preferred embodiment, pressure relief valve 68 is set to open when the pressure of the liquid reaches approximately 300 psi. A release valve 70 having a release button 71 connected thereto is also provided on hydraulic assembly 56. Depressing release button 71 actuates release valve 70 to allow the oil to flow back into reservoir 64. Alternatively, one valve could be provided to accomplish both functions. As the hydraulic pressure on cylinder 66 subsides, springs 72 return to their static, unstretched state, pulling cap 26 downwardly to its original position. An exemplary hydraulic mechanism is manufactured by Save-A-Load of Charlotte, N.C.

In certain preferred embodiments, as seen in FIG. 5, the range within which the stroke of jacking bar 17 operates, that is, the distance cap 26 can travel, can be adjusted. In this embodiment, bulkhead 2 is shown as a mirror image of the embodiments described above with the reduced thickness portions 8, 9, 27 seen on the right. The stroke of a preferred embodiment of jacking bar 17 is approximately 7". In order to adjust the range within which cap 26 can travel, the starting height of hydraulic assembly can be adjusted. More specifically, mounting bar 67 is supported at its lower end by a mounting post 69. Mounting post 69 is secured to panel member 3 by a plate 81. The lower end of mounting bar 67 slides over mounting post 69 and is fixed with respect to mounting post 69 by a pin 73. Pin 73 extends through one of a series of apertures 77 in bar 67 and through an aperture in mounting post 69 (not shown). Thus, by placing pin 73 in a different aperture 77, the starting point for the stroke of jacking bar 17, and, consequently, the starting point for the travel of cap 26 can be adjusted. As seen in FIG. 5, pin 73 is positioned in the uppermost aperture 77 in mounting bar 67, such that the starting point for the stroke of jacking bar 17 is at its lowest point. Seen in dashed lines is the starting position for jacking bar 17 when pin 73 is placed in one of the lower apertures 77. The manual adjustment is preferably accomplished by grasping and moving the actuator 17 up and down in an elongated opening 16. In this embodiment, bar 67 (at least its bottom portion) and post 69 are preferably left uncovered to facilitate the manual adjustment of pin 73. Alternatively, a hinged plate similar to cover 18 may be provided to cover the structure. Other adjustment assemblies, such as a ratchet assembly, could be used in lieu of the pin detent mechanism.

Other suitable means for vertically adjusting the cap could also be used. For example, the hydraulic assembly could be replaced by a screw or ratchet drive assembly, a mechanical jacking bar, or a spring loaded cap having a ratcheted strap in order to pull the cap down. Alternatively, the cap could be moved manually and held in position by a releasable ratchet arrangement.

Figure 7:
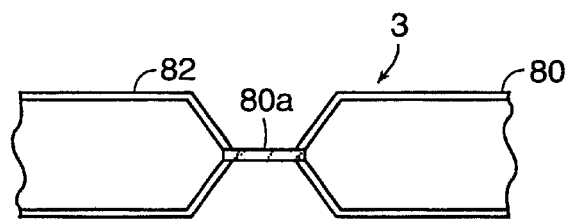
FIG. 7 is a cross-sectional view taken along line VII—VII in FIG. 5.

As seen in FIGS. 5 and 7, bulkhead 2 preferably includes a plurality of guards 80 along each side of a lower portion 82 of panel member 3. Lower portion 82 is preferably covered with a layer of thick plastic such as high density polyethylene (HDPE) or ultra high molecular weight polyethylene (UHMW). Guards are formed by melting, or welding, opposed surfaces of panel member 3 together at spaced locations 80a in a molding process. Guards 80 provide structure for bulkhead 2, increase its strength, and reduce the possibility crushing the filler material within the bulkhead. The guards also protect the bulkhead from damaged by being kicked accidentally or purposefully to adjust the position of the bulkhead in the trailer.

Figure 8:
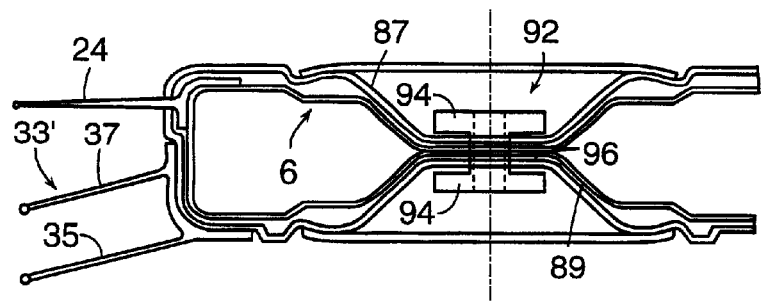
FIG. 8 is a cross-sectional view taken along line VIII—VIII in FIG. 5.
Figure 9:
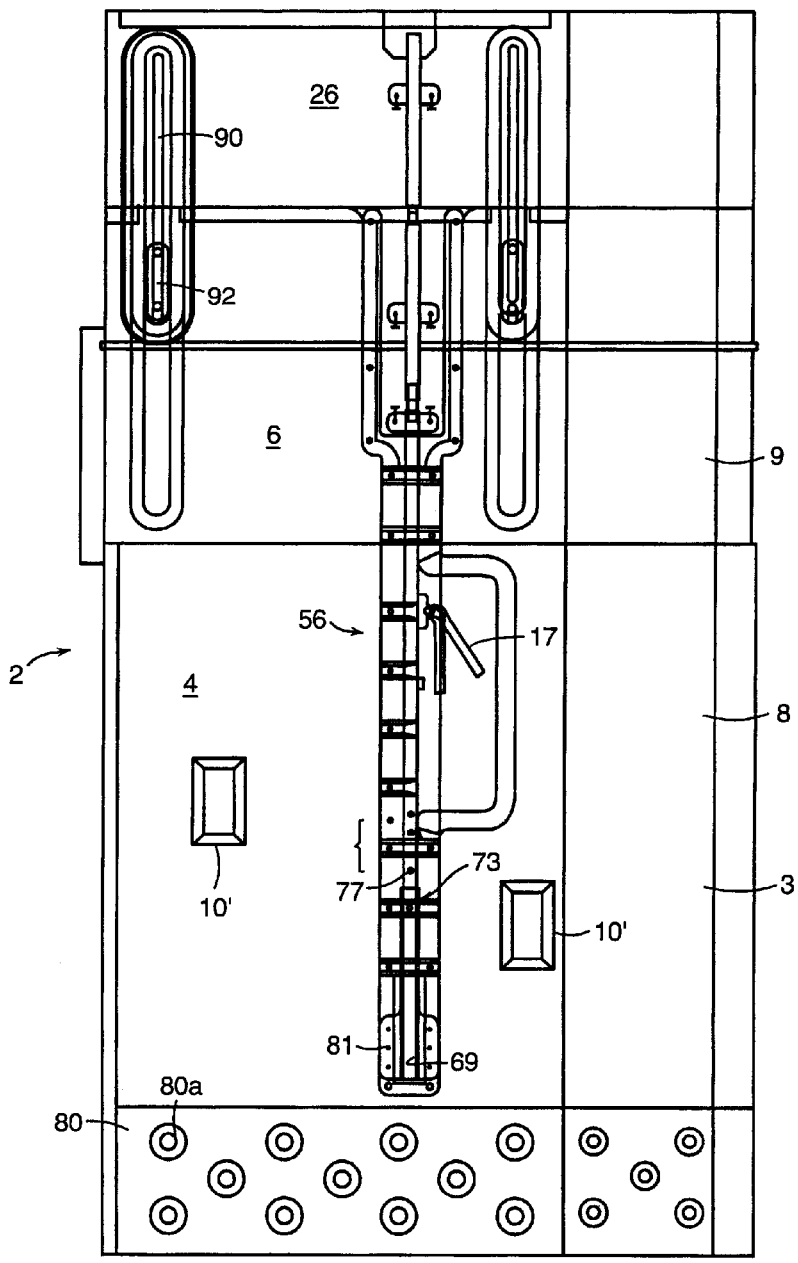
FIG. 9 is an elevational view of the bulkhead of FIG. 5 shown with the cap fully extended vertically.

In a preferred construction, mating channels 87, 89 are formed in guide cap 26 and stem 6, respectively, to guide the vertical movement of the cap (FIGS. 5, 8, and 9). Slots 90 are formed in channel 87 of cap 26. Guide members 92, each preferably formed of two T shaped portions 94, are attached to stem 6 in channels 89, with stem portions 96 of the T shaped portions 94 extending through slot 90. As cap 26 moves vertically along stem 6, the interaction of guide members 92 and slots 90 keeps cap 26 aligned with and slidably attached to stem 6. Guide members 92 are preferably secured to stem 6 proximate an upper edge of bulkhead 2 in order to maximize support for cap 26 when it is in the fully raised position, as seen in FIG. 9.

Figure 3:
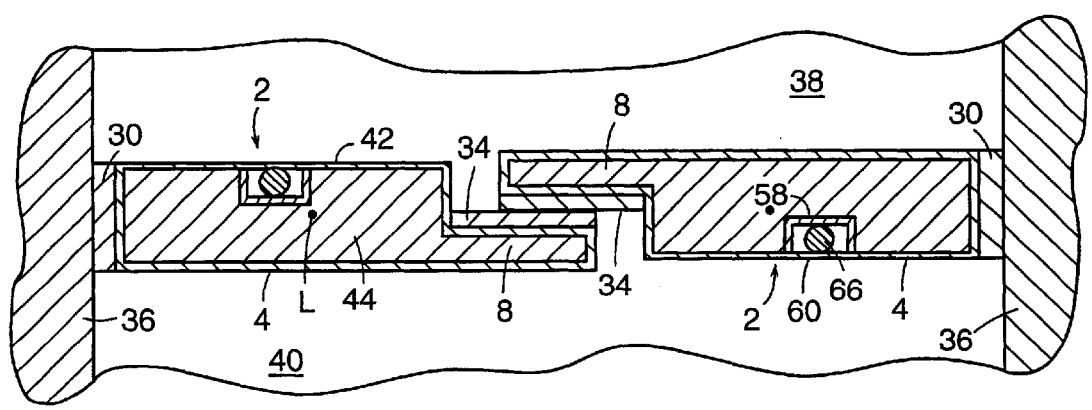
FIG. 3 is a cross-sectional view taken along line III—III in FIG. 2.
Figure 2:
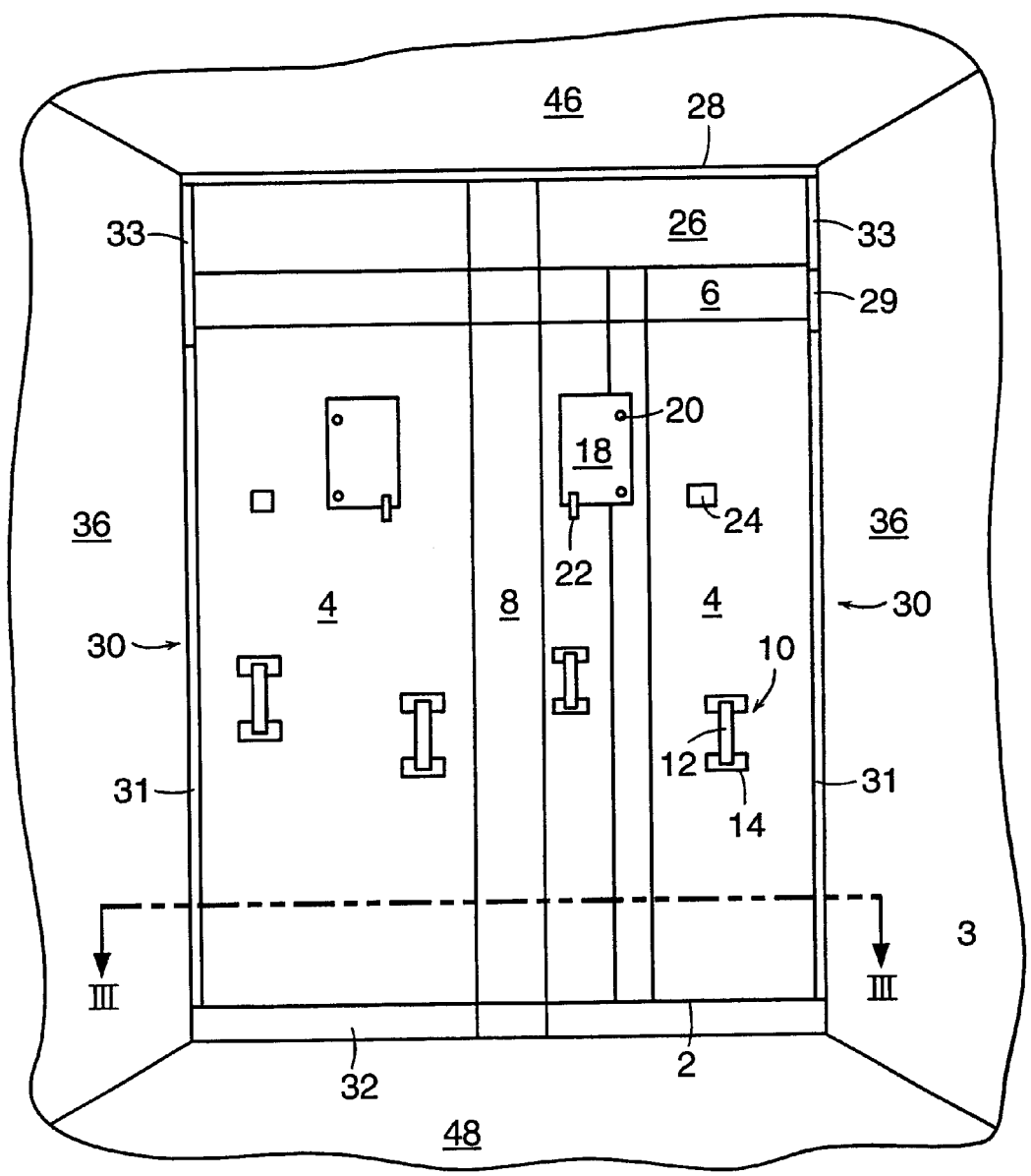
FIG. 2 is an elevational view of two of the bulkheads of FIG. 1, one of the bulkheads being rotated 180O about a vertical axis, in an overlapping relationship and sealingly engaging the ceiling, floor and walls of a container.

In use, as seen in FIG. 2, one of a pair of bulkheads 2 (on the left in this drawing) is rotated 180° about a vertical axis L, and the bulkheads are positioned adjacent one another in overlapping fashion between opposed walls 36 of a container, e.g., a refrigerated trailer, to form a first compartment 38 and a second compartment 40. The front seals 34 of the bulkheads 2 are placed in abutting relationship, side seals 30 engage walls 36, and seals 28 and 32, seen in FIG. 3, provide seals along the ceiling and floor, respectively, of the container. Bulkheads 2 are positioned within the container such that the reduced thickness portions 8, 9, 27 are overlapped an amount necessary in order to accommodate the distance between opposite side walls 36 of the container. Bulkheads 2 can be infinitely adjusted within a given range (i.e., within the width of a reduced thickness portions 8, 9, 27) and can, therefore, be used in a number of different sized refrigerated trailers. In a preferred embodiment, a pair of bulkheads 2 have an adjustment range of at least approximately 6"–8" in a width direction, though other smaller and larger ranges (e.g., up to 12" or more) could also be used.

Consequently, a seal is provided about substantially the entire periphery of the bulkheads 2 to isolate first compartment 38 from second compartment 40. The bulkheads 2 are advantageously tightly secured within the container by a pressure fit without the need for any device other than the bulkheads themselves or for any direct attachment with the container itself. Moreover, the bulkheads are easily adjustable to accommodate trailers of different heights and widths.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. An insulated bulkhead for partitioning a refrigerated container comprising:
   an upper member and a lower member coupled together to form a moveable panel, each member having at least one layer of thermal insulation, the upper and lower members further being vertically adjustable relative to each other to vary the height of the bulkhead; and
   seals provided along substantially the entire periphery of the bulkhead.

2. The bulkhead according to claim 1 in which the upper and lower members each include a reduced thickness portion along at least one vertical edge to define a portion which is adapted to overlap with a reduced thickness portion of another bulkhead and permit horizontal adjustment of the bulkheads relative to each other in partitioning the container.

3. The bulkhead according to claim 2 in which the bulkhead includes a reduced thickness portion along each vertical edge of the bulkhead.

4. The bulkhead according to claim 2, wherein the seals comprise a first seal along a top edge of the bulkhead, a second seal along a side edge of the bulkhead, a third seal along a face of the reduced thickness portion of the bulkhead, and a fourth seal along a bottom edge of the bulkhead.

5. The bulkhead according to claim 2, further comprising a drive operably connected to the upper and lower members to vertically adjust the height of the bulkhead.

6. The bulkhead according to claim 5, wherein the drive assembly is a hydraulic assembly which comprises a hydraulic pump, an actuator to control operation of the hydraulic pump, and drive members operably connected to the upper and lower members and hydraulically driven by the pump to adjust the height of the bulkhead.

7. The bulkhead according to claim 6, wherein the actuator comprises a manually operated jacking bar.

8. The bulkhead according to claim 6, wherein the hydraulic assembly further comprises a relief valve to automatically reduce excess pressure.

9. The bulkhead according to claim 6, further comprising a release valve to allow manual removal of pressurized fluid.

10. The bulkhead according to claim 1, further comprising a drive operably connected to the upper and lower members to vertically adjust the height of the bulkhead.

11. The bulkhead according to claim 10 wherein the drive assembly is a hydraulic assembly which comprises a hydraulic pump, an actuator to control operation of the hydraulic pump, and drive members operably connected to the upper and lower members and hydraulically driven by the pump to adjust the height of the panel.

12. The bulkhead according to claim 10 in which the drive has a fixed range of motion, and the bulkhead further includes an adjustable mount for the drive to increase the range of adjustment for the upper and lower members.

13. The bulkhead according to claim 1, wherein one of the members has a reduced thickness part along an edge thereof, and the other of the members receives the reduced thickness part of the one member.

14. The bulkhead according to claim 13 in which the one member is the lower member and the other member is the upper member.

15. The bulkhead according to claim 13 in which the seals include a side seal having a first seal member secured to a side of the other member, and second seal member secured to the reduced thickness part and projecting through a slot in the side of the other member.

16. The bulkhead according to claim 1, further comprising an aperture in the bulkhead to provide operational access from a front side and a back side of the bulkhead.

17. The bulkhead according to claim 16, further comprising a cover to seal the aperture.

18. The bulkhead according to claim 1, wherein the seal comprises a compressible gasket.

19. The bulkhead according to claim 1, further comprising a hand grip on each of first and second sides of the bulkhead to facilitate moving the bulkhead.

20. The bulkhead according to claim 1, further comprising at least one guide member connected to the lower member, each guide member cooperating with a slot formed in the upper member to guide the upper member vertically along the lower member.

21. An insulated bulkhead for partitioning a refrigerated container comprising:
   a panel having an upper edge, two side edges, a bottom edge, and a reduced thickness portion along at least one of the side edges to define a portion which is adopted to overlap with a reduced thickness portion of another bulkhead and permit horizontal adjustment of the bulkheads relative to each other in partitioning a container, the reduced thickness portion having a front face generally normal to the side edges; and
   a seal along the top edge, the bottom edge, the side edge opposite the reduced thickness portion, and the front face of the reduced thickness portion.

22. The bulkhead according to claim 21 further including a reduced thickness portion along each side edge of the panel.

23. The bulkhead according to claim 22 further including a side seal along each side edge and a front seal along the front face of each reduced thickness portion.

24. The bulkhead according to claim 21 wherein the panel includes an upper member and a lower member coupled together to be vertically adjustable relative to each other to vary the height of the bulkhead.

25. The bulkhead according to claim 24 further comprising a driver operably connected to the upper and lower members to vertically adjust the height of the bulkhead.

26. An insulated bulkhead for partitioning a refrigerated container comprising:
   an upper member and a lower member, one of the members including a stem which is received in a socket of the other member to moveably couple the members together to form a vertically adjustable panel, the member with the socket including a seal along at least one side edge thereof and a slot extending therethrough, and the stem including a seal along a side edge which extends through the slot to form a substantially complete seal between the panel and a wall of the refrigerated container at any vertically adjusted height of the bulkhead.

27. The bulkhead according to claim 26 in which the upper and lower members each include a reduced thickness portion along at least one vertical edge to define a portion which is adapted to overlap with a reduced thickness portion of another bulkhead and permit horizontal adjustment of the bulkheads relative to each other in partitioning the container.

28. The bulkhead according to claim 27, further comprising a drive operably connected to the upper and lower members to vertically adjust the height of the bulkhead.

29. The bulkhead according to claim 26, further comprising a drive operably connected to the upper and lower members to vertically adjust the height of the bulkhead.

30. The bulkhead according to claim 26, further including additional seals along substantially the remaining periphery of the bulkhead.

31. A method of partitioning a refrigerated container comprising the steps of placing a first insulated bulkhead and a second insulated bulkhead in a refrigerated container, each bulkhead having an upper member and a lower member, the upper and lower members each including a reduced thickness portion along a same vertical edge of the bulkhead, the upper and lower members further being vertically adjustable relative to each other to vary the height of each of the first and second bulkheads;

positioning the first and second bulkheads in overlapping fashion such that the reduced thickness portions of the first and second bulkheads abut one another;

adjusting the bulkheads horizontally relative to each other to provide a tight fit against walls of the refrigerated container;

adjusting the upper and lower members of the first and second bulkheads to provide a tight fit against a ceiling and a floor of the refrigerated container.

\* \* \* \* \*